United States Patent [19]

Grinvald

[11] Patent Number: 5,463,426
[45] Date of Patent: Oct. 31, 1995

[54] IMAGE ACQUISITION AND ENHANCEMENT METHOD AND SYSTEM

[76] Inventor: Amiram Grinvald, 1 Meonot Wix, Weizman Institute of Science, Rehovot 76100, Israel

[21] Appl. No.: 368,400

[22] Filed: Jan. 3, 1995

Related U.S. Application Data

[63] Continuation of Ser. No. 136,917, Oct. 18, 1993, abandoned.

[30] Foreign Application Priority Data

Oct. 18, 1992 [IL] Israel ............................................ 103463

[51] Int. Cl.⁶ ........................................................ H04N 5/21
[52] U.S. Cl. ............................................. 348/625; 348/180
[58] Field of Search ............................ 348/69, 229, 216, 348/180, 184, 189, 625, 622, 627; H04N 5/21, 17/00

[56] References Cited

U.S. PATENT DOCUMENTS

| | | | |
|---|---|---|---|
| 4,625,240 | 11/1986 | Yablonski et al. | 358/174 X |
| 4,928,172 | 5/1990 | Uehara et al. | 358/174 X |
| 5,226,504 | 6/1993 | Webb et al. | 358/139 |

Primary Examiner—Victor R. Kostak
Attorney, Agent, or Firm—Sughrue, Mion, Zinn, Macpeak & Seas

[57] ABSTRACT

An image enhancement method, wherein video analog signals are provided, a reference analog image is selected and the signals of the image are digitized, the digitized signals are converted to video analog reference signals, the reference signals are synchronized with video analog signals to be enhanced, the converted analog reference signals are subtracted from the video analog signals, and only then the subtracted analog signals are amplified, so as to obtain a sequence of enhanced images, in real time. There is also provided an image enhancement system.

9 Claims, 1 Drawing Sheet

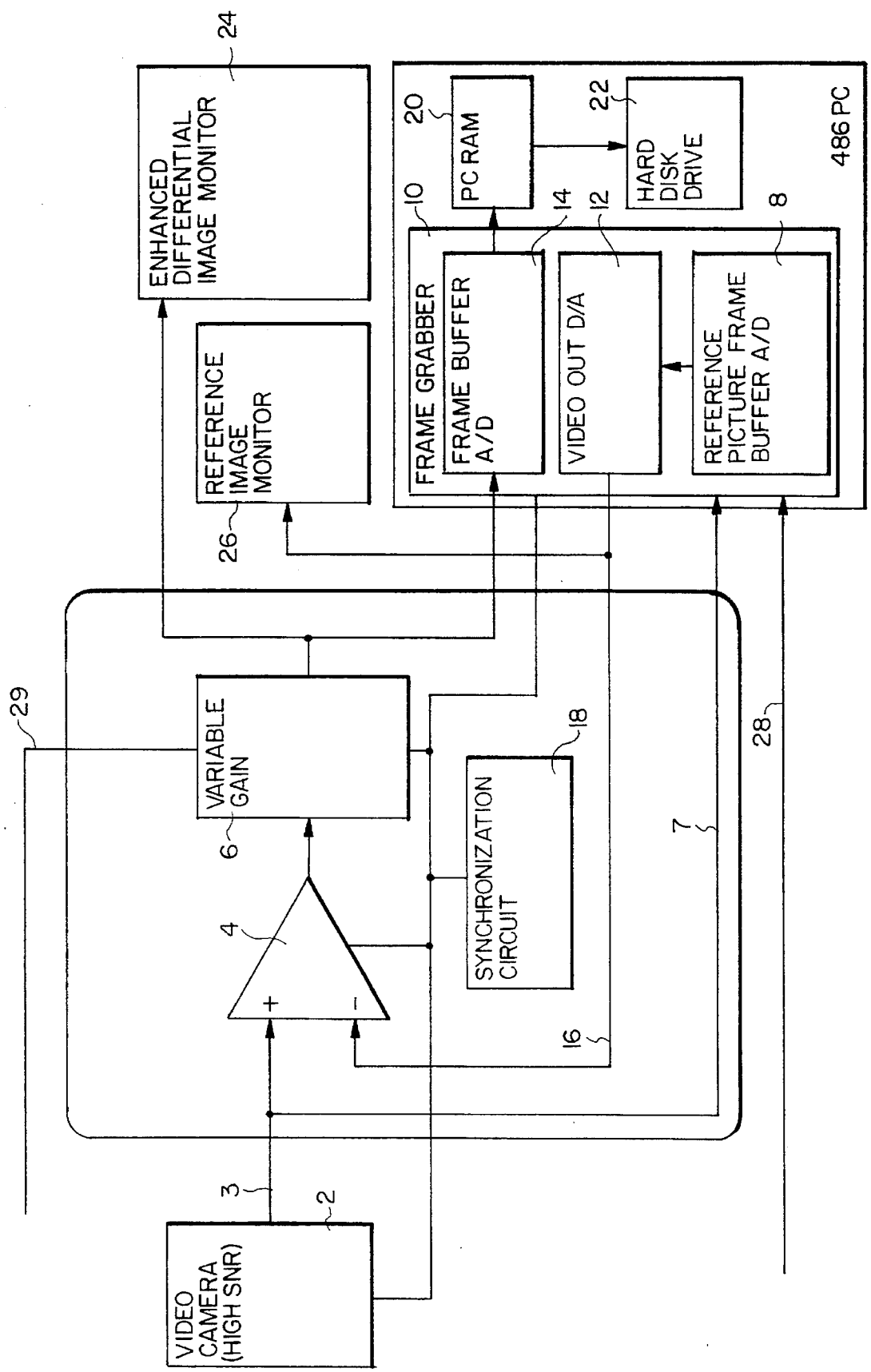

IMAGE ACQUISITION AND ENHANCEMENT METHOD AND SYSTEM

This is a Continuation of application Ser. No. 08/136,917 filed Oct. 18, 1993, now abandoned.

BACKGROUND OF THE INVENTION

The present invention relates to an image enhancement method and system and more particularly, to an image enhancement method and system for low contrast or stationary images.

The use of video cameras, video movies and video-tapes has, to a large extent, replaced films, as the media for image recording and storage. Consequently, the use of digital storage of video images is growing rapidly and digital storage begins to replace tape-storage.

To digitally store a video image, or a video movie, one usually digitizes the data with a frame grabber. This device digitizes the value of each pixel in the video-image and then stores the digitized data on various types of digital memories, such as a computer memory, hard disk drives or optical disks. The reliability of digital storage devices on the one hand, coupled to the continuous reduction in their cost/performance (optical disks), makes digital storage the method of choice.

Most frame grabbers digitize the image with 8-bit accuracy, i.e., 1 gray level in 256 levels for the entire dynamic range of an image. This digitization is accomplished at video-rates (up to 60 Hz), and required digitization at 10–40 MHz. This accuracy is not sufficient for various scientific and industrial applications, as well as not sufficient for "natural" color display of digital images. One suggested solution is to digitize the image with 12 or more bits. This solution is technically demanding, and a proposed 12-bit frame grabber is even far more expensive than the common 8-bit accuracy digitizer. Furthermore, the 8-bit accuracy is not adequate for several applications in which the observation of the small details in the image is crucial, since these details are weaker than 1 part in 256.

One known way to detect small changes in the image contrast is to apply image enhancement techniques, i.e., to increase the contrast of the image. Most of the currently available methods use various techniques to enhance the image after its initial digitization, using 8-bit accuracy. For example, there is available a video-enhancement system (mostly for biological observations) in which after the digitization, a background DC level is subtracted from the low contrast image, and then the difference is digitally amplified and displayed. Digital image processing is then used to enhance the image further, e.g., edge detection/enhancement, color coded display, etc. The common disadvantages of all of these approaches is that all the details that were smaller than 1 part in 256 gray levels were already lost, because they were digitally recorded with a precision of eight-bits only.

While digital cameras providing 14 bits accuracy exist, they are typically 100 times slower. Therefore, such cameras are not suitable for applications requiring a fast image acquisition/display rate.

Another known image enhancement method is applied to video data prior to the digitization. In such a case, applicable for low contrast images only, a background DC level is subtracted from the camera output, and the remaining level is amplified in an analog manner prior to the digitization. Such a DC subtraction is already implemented in several commercial cameras (internal subtraction) or in external devices which first subtract a DC level and than amplify the remaining signals, taking care of the synchronization of the video signal.

SUMMARY OF THE INVENTION

It is therefore a broad object of the present invention to provide an image enhancement method and system which ameliorates the disadvantages of the known image enhancement systems and in which the accuracy of the recorded image is increased.

It is a further object of the present invention to provide an image enhancement method and system for the enhancement of the precision and dynamic range at a given digital frame-grabber by 10 to 64 times for low contrast images or for stationary images.

In accordance with the present invention there is provided an image enhancement method, comprising the steps of providing video analog signals; selecting a reference analog image from said video signals and digitizing the signals of said image; converting the digitized signals to video analog reference signals; synchronizing said reference signals with video analog signals to be enhanced; continuously subtracting said converted analog reference signals from said video analog signals, and amplifying the subtracted analog signals, so as to obtain a sequence of enhanced differential images, in real time.

The invention further provides an image enhancement system, comprising a differential amplifier, having a first input and a second input, receiving video analog signals applied to said first input; reference image circuit means connected to said first input of said amplifier, continuously receiving said video analog signals; means for selecting a video reference image constituted by analog reference signals and digitizing same; a digital to analog converter for converting said digitized signals into analog signals and for applying said analog signals to the second input of said amplifier; synchronization circuit for synchronizing said reference signals with said analog video signals; said differential amplifier including circuit means for continuously subtracting said converted analog signals from said analog video signals, and for amplifying the subtracted signals to form enhanced differential images in real time.

BRIEF DESCRIPTION OF THE DRAWINGS

The sole FIGURE is a block diagram of an image enhancement system.

DESCRIPTION OF THE PREFERRED EMBODIMENTS

The invention will now be described in connection with certain preferred embodiments with reference to the block diagram of the drawing so that it may be more fully understood.

With specific reference now to the block diagram, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawing making apparent to those skilled in the art how the several forms of the invention may be embodied in practice.

Seen in the block diagram of the system according to the present invention, the system includes is a video analog signal input unit 2 constituted by e.g., a high signal to noise ratio video camera, feeding signals to both, a first input 3 of a differential amplifier 4, having a gain control 6, set by a signal through which, for clarity, is shown separately, as well as via lead 7 to a reference picture frame buffer 8 of a frame grabber 10. The latter also includes a digital to analog converter 12 fed by the reference picture frame buffer 8 and a frame buffer analog to digital converter 14 to which, signals amplified by the differential amplifier 4 are applied. The converter 12 has an output 16 leading to a second input of the differential amplifier 4. Further seen is a synchronization circuit 18 interconnected with the input unit 2, the amplifier 4, the gain control 6 and with the frame grabber 10.

The output from the frame grabber 10 advantageously, leads to a PC ram 20 and therefrom to a hard disk drive 22. Optionally there may be provided a monitor 24 for displaying enhanced images connected to the output from the variable gain control of the differential amplifier 4, and there may also be provided a reference image monitor 26 connected to the output line 16 for displaying a fixed reference image. The reference picture frame buffer 8 is triggered through line 28.

The image enhancement system of the present invention operates as follows: The input image information or signals, as produced by the video camera of input unit 2, is applied to both, the differential amplifier 4, as well as to the frame grabber 10. At any selected instant, the frame buffer 8 is actuated, via line 28, so as to form a reference image therein. The latter is then digitized in the frame grabber 10 and the digitized signals stored in the frame buffer 8 are, in turn, converted into analog signals in converter 12 and applied, via output 16 to the second input of the differential amplifier 4. Hence, the differential amplifier 4 continuously obtains signals as applied from the input unit 2, as well as from the reference picture frame buffer 8, through the converter 12.

In the differential amplifier 4, the thusly produced reference signals are synchronized with the signals of the input 2 by means of the synchronization circuit 18 and are continuously subtracted from the signals therein. Depending on the gain setting of the gain control 6, which can be set to a desired level of amplification the subtracted analog signals are amplified by a factor of 1 to 64 and only then applied to the frame grabber 10 to be digitized with e.g., a standard 8-bit digitizer. All of the above steps are performed in real time. The enhanced differential images are displayed and viewed on the monitor 24 and likewise, the reference images can be displayed and viewed on monitor 26.

The digital images of a given reference image and the corresponding enhanced sequence of images (as a function of time at video rates) can eventually be combined on or off-line. The accuracy of the resulting images is equivalent to 12 1or 14 bit digitization depending on the gain used.

The output from the frame grabber 10 containing the enhanced images in a digitized form can then be transferred to the PC ram 20 and, in turn to the hard disk drive 22, for storage and eventual retrieval.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An image enhancement method, comprising the steps of:

providing a video analog signal; selecting a reference analog image from said video analog signal and digitizing said image;

converting the digitized image to a video analog reference signal;

synchronizing said video analog reference signal with a video analog signal to be enhanced;

continuously subtracting said video analog reference signal from said video analog signal, and amplifying the subtracted analog signal, so as to obtain a sequence of enhanced differential images, in real time.

2. The method as claimed in claim 1 further comprising the step of digitizing said sequence of enhanced images and storing the digitized signals.

3. The method of claim 1 further comprising the step of monitoring the enhanced differential analog signals, while digitizing said signals.

4. The method as claimed in claim 1 further comprising the step of setting the desired amplification of the subtracted analog signals.

5. An image enhancement system, comprising:

a differential amplifier, having a first input and a second input, receiving video analog signals applied to said first input;

reference image circuit means connected to said first input of said amplifier, continuously receiving said video analog signals;

means for selecting a video reference image constituted by analog reference signals and digitizing same;

a digital to analog converter for converting said digitized signals into analog signals and for applying said analog signals to the second input of said amplifier;

synchronization circuit for synchronizing said reference signals with said analog video signals;

said differential amplifier including circuit means for continuously subtracting said converted analog signals from said analog video signals, and for amplifying the subtracted signals to form enhanced differential images in real time.

6. The system as claimed in claim 5, wherein said differential amplifier is provided with a gain control.

7. The system as claimed in claim 5, further comprising a frame grabbing means for digitizing said analog video signals, prior to and after amplification.

8. The system as claimed in claim 5 further comprising a monitor connected to the output of said differential amplifier for monitoring enhanced differential images.

9. The system as claimed in claim 7 further comprising a memory connected to said frame grabbing means for storing and eventual retrieving the enhanced digitized signals.

* * * * *